United States Patent [19]
Racine

[11] 3,779,587
[45] Dec. 18, 1973

[54] TUBE END FITTING

[76] Inventor: William H. Racine, P.O. Box 378, Lakeside, Mich.

[22] Filed: Aug. 23, 1972

[21] Appl. No.: 283,181

[52] U.S. Cl............. 285/312, 285/179, 285/323, 285/346
[51] Int. Cl............................................ F16l 37/20
[58] Field of Search................... 285/312, 346, 104, 285/105, 309, 310, 311, 323, 322, 179; 138/89, 90

[56] References Cited
UNITED STATES PATENTS

| | | | |
|---|---|---|---|
| 1,784,821 | 12/1930 | Crowley | 285/312 X |
| 1,784,822 | 12/1930 | Crowley | 285/312 X |
| 1,340,785 | 5/1920 | McMullin | 285/312 X |

*Primary Examiner*—Thomas F. Callaghan
*Attorney*—Jack E. Dominik et al.

[57] ABSTRACT

A fitting for mounting to tube ends by actuating quick operating means to translate a ram element inside a body housing against a tubular plug having an opposite end which sealingly compresses against the end of a smooth wall tube. The fitting more advantageously includes a split collet which clamps the circumference of the smooth wall tube simultaneously with compressing the tubular plug by the quick operating means, such as a torque transmitting lever.

2 Claims, 2 Drawing Figures

PATENTED DEC 18 1973 3,779,587

TUBE END FITTING

This invention relates to a ftting for mounting to the ends of smooth wall tubes by compressing a tubular plug against the end of the tube upon translation of a ram element within the housing. The invention particularly relates to such a fitting which can be quickly and efficiently mounted to provide a good seal and holding action so that fluids passing through the smooth wall tube may be sealed by the fitting or may be conveyed out of the fitting into auxiliary tubing mounted thereto.

The present applicant has disclosed a fitting which is quickly mounted to smooth wall tubes in Ser. No. 229754, filed Feb. 4, 1972, which application is a continuation-in-part of Ser. No. 141480, filed May 10, 1971, by the same applicant. That application disclosed and claimed a quick mounting fitting for smooth wall tubes particularly used in the air-conditioning industry for conveying refrigerant fluids. That application showed a housing of a ram element which was translated along the longitudinal axis of the housing to compress a seal positioned circumferentially on the smooth wall tube. Such a seal alone or together with a split collet assumes a clamping relationship upon translation of said ram element by quick operating means such as a torquing lever.

It is desirable to provide a fitting having advantageous features similar to those disclosed in the co-pending application, as well as other advantageous features for providing additional means of quickly mounting the fitting to a smooth wall tube. In particular it would be desirable to mount such a fitting by providing a seal which compressively seals the end of the tube.

It is accordingly an important object of the present to provide an improved quick mount fitting for compressing an elastomeric plug in sealing engagement to the end of a smooth wall tube.

Another important object of the invention is a quick mount fitting which translates an elastomeric plug against the end of a tube fitting to seal such a tube or, alternatively, to couple such a tube to an auxiliary conduit mountable on the fitting.

Still yet another important object of the present invention is a quick mount fitting for mounting to the ends of smooth wall tubes so that a simple torquing action operates to simultaneously compress the sealing member against the tube and to clamp the tube by reducing the diameter of a split collet mounted around the tube within the fitting.

Objects such as those listed are attained together with still other objects which will occur to practitioners by the quick mount fitting shown in the following disclosure, including drawing wherein.

Figure 1:
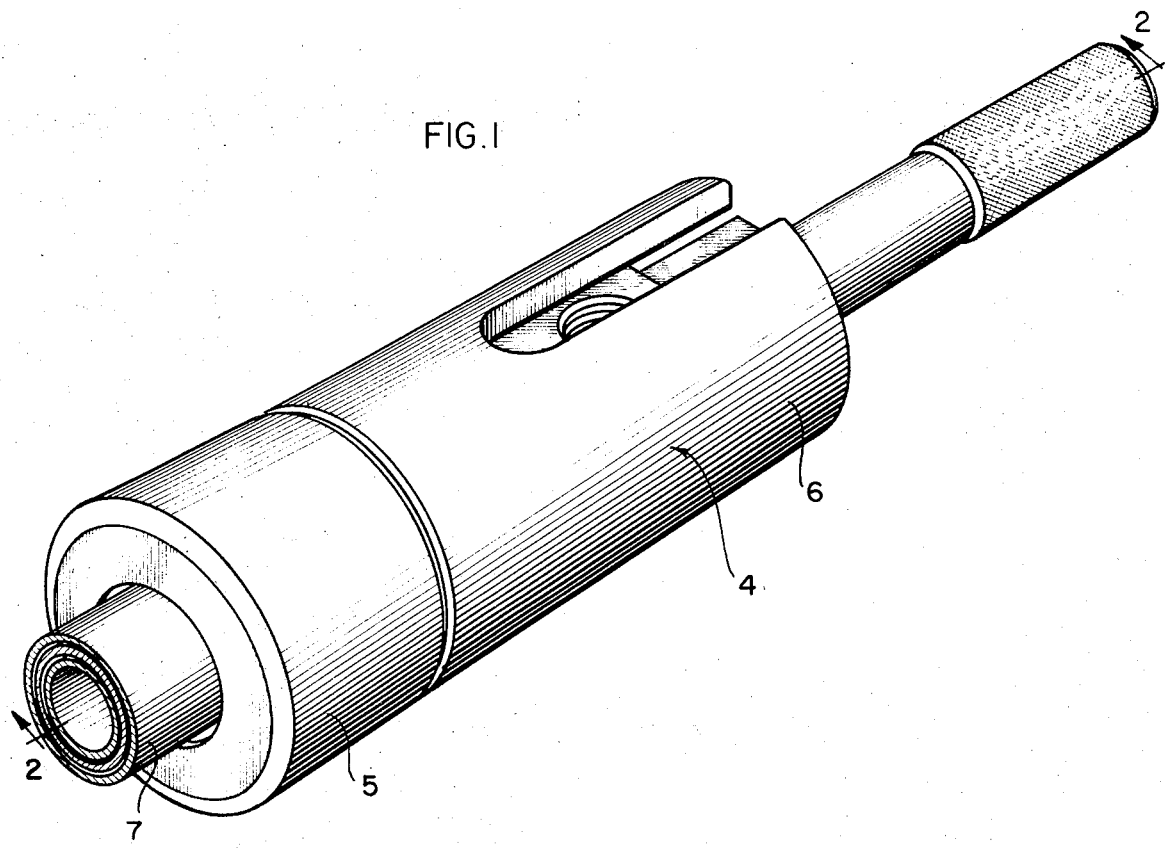
FIG. 1 is a prespective view of the end tube fitting.
Figure 2:
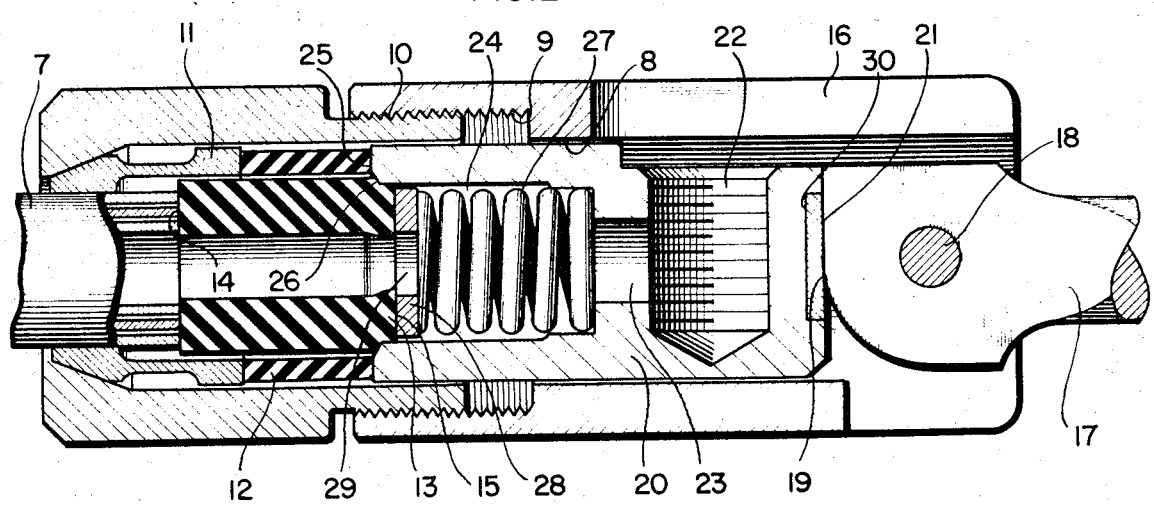
FIG. 2 is a sectional view taken along line 2—2 of FIG. 1.

The tube fitting comprises a generally elongated housing 4 which is shown in two parts. A forward part is a tubular head 5, and the rearward part is a tubular body 6. The tubular head has an entry for sealing the end of a smooth wall tube 7. A housing passageway 8 extends along the substantial length of the housing 4. Body part 6 has a forward internally threaded end 9, and head tubular part 5 has a rearward exterior threaded end 10. The threaded engagement of the two parts can be adjusted as desired.

The tubular head part 5 of the housing includes an annular split collet 11 which is circumferentially mounted on the tube 7. The split collet in the tubular head part 5 is of similar construction as shown in the previous co-pending application. The interior of the head part adjacent the smooth wall tube entry and the forward part of the collet have complementary tapered surfaces which operate to reduce the diameter of the collet as it is advanced towards the tubular head entry, in a manner known in the art and described in detail in the co-pending application. An annular elastomeric spacer 12 joins the split collet 11 and such spacer is used to transmit translating force toward the tubular head entry as will be later described. A tubular sealing plug is positioned partly within the collet to compressively engage the end of the smooth wall tube 7 and such sealing plug is shown as a tubular plug 13. A substantial portion of the plug extends out of the collet. The plug includes an end 14 which is at least thicker than the thickness of the smooth wall tube 7. The spacer is positioned around the sealing plug and has one end for contacting the end of the split collet member, and such spacer has an opposite end which terminates short of the sealing plug end. The plug has an opposite force receiving end 15, and a passageway extends between ends 14, 15 as shown. In the alternative, a solid plug could be employed if it were desired to totally seal the fluids within the smooth wall tube 7.

The body part 6 is shown with an elongated body slot 16 opened at the back and closed at the front. The body slot serves several purposes, including providing space to accommodate a ram actuating lever or means 17 when such illustrated lever is moved along a pivot 18 so that its torque actuating face 19 translates a ram 20 towards the tubular head entry. The ram has a torque receiving face 21 which is engaged by the high and low cam surfaces of the torque actuating face 19 of the lever 17.

The ram element is also shown with a threaded bore 22 for receiving an auxiliary conduit (not shown). A communicating port 23 extends between bore 22 in chamber 24 and the ram element 20. The annular edge of the ram element which defines such chamber has an outer seal contact face 25 and an inner plug contact face 26. Face 25 transmits compressive force to spacer seal 12, and face 26 transmits compressive force to plug seal 13.

It has been found desirable to fabricate the fitting from aluminum material, but such materials have low abrasion resistance which leads to undesirable wear. Accordingly, a spring 27 in the chamber 24 is provided for effecting some back force when ram actuating means 17 is operated. It has been found that back force from biasing means, such as those illustrated, markedly reduces wear in similar lower abrasion resistant materials. A plate 28 is interposed between the final turn of the spring 27 and the force receiving end 15 of the sealing plug 13. The material of such a plate is understandably harder or more dense than the elastomeric material of the sealing plug 13. Such a plate is shown with a central opening 29 so that fluids from the smooth wall tube 7 may be conveyed to bore 22 into the auxiliary conduit mounted thereto. If desired, a solid plate or disc may be substituted so that the fluid path terminates at the force receiving end of the sealing plug. Also, a solid sealing plug may be employed as previously suggested.

Other means and features may be included to further serve the purposes of this invention, and reference should be made to the foregoing co-pending application to understand some of these features. For example, an additional wear resistant insert or button indicated in dotted line at 30 could be positioned in the torque receiving space 21 of the ram element 20. Such and other features will understandably come within the scope of the invention as defined by the following claims, which language may be better understood by reference to the previous disclosure.

What is claimed is:

1. A fitting for end sealing of a smooth wall tube, including
    a housing having a tubular head threadably engaged to a tubular body,
    a passageway in said housing,
    an entry for tube end in said tubular head, an inside taper at said tube entry,
    a split collet member positioned next to said inside taper, said split collet member having a forward outside taper complementary to the inside taper at said tube entry so that said collet assumes a clamping relationship to the smooth wall tube upon receiving force directed towards the housing body tube entry,
    an elastomeric sealing plug positioned partly within said collet member and having a substantial portion extending out of said collet member,
    an annular spacer positioned around said sealing plug and next to said split collet member, said spacer terminating short of the end of the sealing plug extending out of the collet,
    a ram element in the housing passageway, said ram element having an annular outer face to engage said spacer and an annular inner face to engage said sealing plug, and
    quick operating means mounted to said tubular body to translate said ram element within the housing passageway against said spacer and sealing plug so that said sealing plug assumes a sealing relationship with the terminal end of said smooth wall tube and said split collet member is moved into clamping relationship with the outside of said smooth wall tube.

2. A fitting which includes the features of claim 1 above, wherein said ram element includes a chamber and said chamber being defined by a forward annular edge of the ram element, said inner and outer faces being defined by said ram edge, and biasing means within said ram element chamber engaging said sealing plug and said chamber to provide back force on translation of said ram element.

* * * * *